United States Patent Office 3,558,784
Patented Jan. 26, 1971

3,558,784
ANTHELMINTIC COMPOSITIONS AND METHODS OF CONTROLLING PARASITIC HELMINTHS IN ANIMALS
Friedrich Paltauf, Graz, Austria, and Alfred Margot and Paul Brenneisen, Basel, Switzerland, assignors to Geigy Chemical Corporation, Greenburgh, N.Y., a corporation of Delaware
No Drawing. Continuation of application Ser. No. 516,096, Dec. 23, 1965. This application Sept. 21, 1967, Ser. No. 669,653
Claims priority, application Switzerland, Dec. 30, 1964, 16,868/64, 16,869/64
Int. Cl. A61k 27/00
U.S. Cl. 424—302                                            18 Claims

ABSTRACT OF THE DISCLOSURE

Compositions and methods for controlling helminths utilizing isothiocyano derivatives of diphenylethers, -thioethers, -sulfoxides and -sulfones.

---

The present invention concerns new anthelmintically active compositions and feedstuffs which contain isothiocyano derivatives as active substances, their use for combatting parasitic helminths and for the prevention of helminthiasis as well as other syndromes caused by the presence of helminths, and concerns also a process for the production of such compositions. The compositions according to the invention can be either in the form of veterinary-medicinal preparations or of feed additives.

In the present description, the term "helminths" refers to nematodes, cestodes and trematodes, i.e., to worms which infest the gastrointestinal tract, the liver and other organs.

Of the endoparasites which occur in farm or domestic animals, helminths are among those which cause the greatest damage to these animals. Not only do the animals attacked show retarded growth or poor increase in weight because of the insufficient utilization of feed given to them, but often injuries occur which can result in the death of the animals. It is, therefore, of great importance to develop veterinary agents and feed additives which are suitable for combatting helminths in all stages of their development and for preventing damages caused by them (helminthiasis). Up to the present, a number of substances has been recommended as anthelminthics, but they are not completely satisfactory, be it that they show only a very specific action on certain helminths or that their action is either weak, if applied in toxicologically tolerable doses, or undesirable side effects appear leading to severe organic injuries, if they are applied in fully effective doses. For example, allyloxy-phenyl isothiocyanate described as an anthelimintic agent is of considerable toxicity.

It has now been found that verterinary-medicinal agents or feed additives which contain an active ingredient selected from the class consisting of isothiocyano compounds of the formula

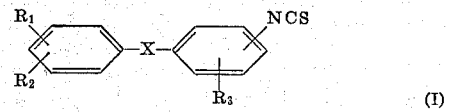

(I)

wherein $R_1$, $R_2$ and $R_3$ independently of each other represent hydrogen, halogen atoms, hydroxyl, nitro, cyano, thiocyano, isothiocyano, carboxy, alkoxycarbonyl, or sulphamoyl groups, or alkyl of 1 to 9 carbon atoms, alkoxy, alkylthio, halogenoalkyl, alkylamino, dialkylamino, alkanoylamino, N-alkylsulphamoyl, N,N-dialkylsulphamoyl, alkylsulphonylamino, halogenoalkylsulphonylamino, arylsulphonylamino, alkylsulphony or akylsulphinyl radicals, and X represents oxygen, sulphur or the sulphonyl or sulphinyl group, and the salts of those compounds falling under Formula I which are capable of salt formation, more especially those containing at least one carboxyl group, which compounds form anthelmintically active alkali metal or ammonium salts, and those containing at least one alkylamino or dialkylamino radical, which compounds form addition salts with inorganic or organic acids, which addition salts are substantially nontoxic to the animal organism, are very effective against helminths, and that because of their lower toxicity in warm blooded animals and good tolerance by the organism, these substances are very well suited for combatting the said endoparasites and for controlling the disturbances and symptoms caused by them. When used as ingredients of food additives, these substances contribute to a rapid increase in weight, better utilization of the feed, and an improvement in the general state of health of the animals. Feed additives containing these compounds have, therefore, special importance for the feeding of farm and domestic animals, in particular for that of growing animals, e.g., of young pigs, cattle, in particular farrows, calves or lambs, but also horses, dogs, rodents, fur-bearing animals, fowls, chicks, pets or caged birds.

The term of "controlling" helminths in animals, as applied in the appended claims, means combatting helminths in domestic and farm animals infested by them as well as preventing damage and troubles that could be caused by infestation with these helminths, in particular in helminthiasis.

New isothiocyano derivatives selected from the class consisting of compounds of the formulas

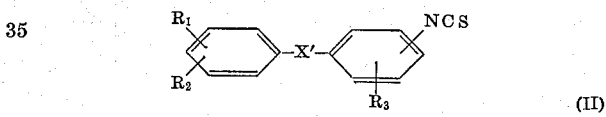

(II)

wherein $R_1'$ represents bromine, hydroxyl, nitro, cyano, isothiocyano, carboxy, alkoxycarbonyl or sulphamoyl groups, alkoxy, alkylthio, halogenoalkyl, alkylamino, dialkylamino, alkanoylamino, N-alkylsulfamoyl, N,N-dialkyl-sulfamoyl, alkylsulfonylamino, halogenoalkylsulfonylamino, arylsulfonylamine, alkylsulfonyl or alkylsulfinyl radicals, $R_2$ and $R_3$ have the same meanings as in Formula I, and $X'$ is oxygen or sulfur; and

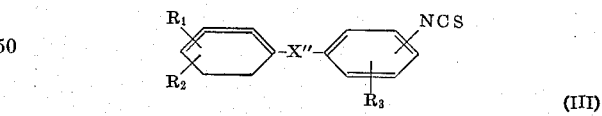

(III)

wherein $R_1$, $R_2$ and $R_3$ have the meanings as in Formula I, and
$X''$ is the sulfonyl or sulfinyl group, as well as the salts of these compounds substituted as defined after Formula I, are particularly valuable.

Each of the alkyl moieties in the alkoxy, alkylthio, halogenoalkyl, alkyl- or dialkylamino and alkanoylamino radicals, alkyl-sulphamoyl, dialkylsulphamoyl, alkylsulphonylamino, halogenoalkylsulphonylamino, alkylsulphonyl and alkylsulphinyl radicals symbolized by $R_1$, $R_1'$, $R_2$ and $R_3$ in Formulas I, II and III, respectively, contains from 1 to 4 carbon atoms, i.e., it is a "lower" alkyl moiety.

Some of the active substances of general Formula I are known and all can be obtained by known processes, for example by reacting correspondingly substituted aminodiphenyl ethers, sulfides, sulfoxides or sulfones with thiophosgene.

The compositions according to the invention can contain, for example, the active substances of general Formula I the preparation of which is described in the following non-limitative examples. Parts and percentages are given therein by weight unless expressly stated otherwise. Temperatures are in degrees centigrade.

EXAMPLE 1

A suspension of 11 parts of 4,4'-diaminodiphenyl ether in 50 parts by volume of water is added within about 80 minutes to a well stirred emulsion of 14 parts of thiophosgene in 50 parts by volume of ice water. The temperature of the reaction mixture is kept at 10–12° by ice cooling. On completion of the addition, the mixture is stirred for 2 hours at room temperature, the precipitate formed is then separated by suction filtration and the residue is washed neutral with water. After drying in vacuo, the residue is dissolved in 20 parts by volume of ether and the 4,4'-bis-isothiocyanodiphenyl ether is precipitated by the addition of 60 parts by volume of petroleum ether. Yield rate: 83.4 of the theoretical. M.P. 67.5–68.5°.

EXAMPLE 2

23.6 parts of 2-amino-2'-chlorodiphenyl sulphide are added in portions to a well stirred emulsion of 15.4 parts of thiophosgene in 100 parts by volume of ice water, the addition being made within 2 hours. The temperature is kept at 8–15° by ice cooling. On completion of the addition, the mixture is stirred for 12 more hours at room temperature, the mixture is then extracted with ether, washed well with water separated and dried over sodium sulphate. The dry ether phase is then filtered, the filtrate is clarified with animal charcoal and evaporated in vacuo to remove the ether. The oily residue is crystallized from petroleum ether. Yield rate: 79.5% of the theoretical, M.P. 48–49°.

EXAMPLE 3

24.7 parts of 3-amino-4-methyldiphenyl sulphone are added in portions within 90 minutes to a well stirred emulsion of 15.4 parts of thiophosgene in 100 parts by volume of ice water. The temperature is kept at 10–12° by ice cooling. On completion of the addition, the mixture is stirred for 12 more hours at room temperature. The pale grey precipitate formed is separated by suction filtration, washed neutral with water, dried in vacuo, digested with the ether and filtered under suction. Yield rate: 83% of the theoretical. M.P. 106–107°.

EXAMPLE 4

26.2 parts of 2-amino-4'-nitrodiphenyl sulphoxide are added in portions within 2 hours to a well stirred emulsion of 15.4 parts of thiophosgene in 100 parts by volume of ice water. The temperature is kept at 8–14° by ice cooling.

On completion of the addition, the mixture is stirred for 12 more hours at room temperature, the precipitate formed is separated by suction filtration and washed neutral with water. After drying in vacuo, the residue obtained is recrystallized from acetone with the addition of animal charcoal. Yield rate: 56% of the theoretical. M.P. 116–117°.

In analogous manner the following compounds of Formula I can be prepared:

(1) 2-isothiocyano-4-chloro-diphenylether
(2) 2-isothiocyano-4',5-dichloro-diphenylether
(3) 2-isothiocyano-3'-methyl-4-carboxy-diphenylether
(4) 2-isothiocyano-2'-thiocyano-diphenylether
(5) 2,4-diisothiocyano-diphenylether
(6) 2,4-diisothiocyano-4'-chloro-diphenylether
(7) 2,4,4'-trisisothiocyano-diphenylether
(8) 2-isothiocyano-4-(N-phenyl-N-ethyl-sulfamoyl)-diphenylether
(9) 2-isothiocyano-2'-thiocyano-4,4'-dichloro-diphenylether
(10) 2,4-diisothiocyano-3'-diethylamino-diphenylether chlorohydrate
(11) 3-isothiocyano-2'-acetylamino-diphenylether
(12) 4-isothiocyano-diphenylether
(13) 4-isothiocyano-2-carboxy-diphenylether
(14) 4-isothiocyano-4'-chloro-diphenylether
(15) 4-isothiocyano-4'-bromo-diphenylether
(16) 4-isothiocyano-2',4'-dichloro-diphenylether
(17) 4-isothiocyano-2,4'-dichloro-2'-methoxy-diphenylether
(18) 4-isothiocyano-2,4'-dicholro-3'-methyl-diphenylether
(19) 4-isothiocyano-2-nitro-3',4'-dichloro-diphenylether
(20) 4-isothiocyano-2'-trifluoromethyl-4'-chloro-diphenylether
(21) 4-isothiocyano-3'-trifluoromethyl-4'-chloro-diphenylether
(22) 4,4'-diisothiocyano-2'-chloro-diphenylether
(23) 4-isothiocyano-3'-trichloromethyl-diphenylether
(24) 4-isothiocyano-4'-methyl-diphenylether
(25) 4-isothiocyano-4'-tert.butyl-diphenylether
(26) 4-isothiocyano-4'-octyl-diphenylether
(27) 4-isothiocyano-4'-hydroxy-diphenylether
(28) 4-isothiocyano-4'-methoxy-diphenylether
(29) 4-isothiocyano-4'-methylthio-diphenylether
(30) 4-isothiocyano-4'-nitro-diphenylether
(31) 4-isothiocyano-4'-cyano-diphenylether
(32) 4-isothiocyano-3'-methoxy-diphenylether
(33) 4,4'-diisothiocyano-2-cyano-diphenylether
(34) 4,4'-diisothiocyano-2'-methyl-diphenylether
(35) 4-isothiocyano-4'-methoxycarbonyl-diphenylether
(36) 4-isothiocyano-4'-(N,N-dimethyl-sulfamoyl)-diphenylether
(37) 4-isothiocyano-4'-methylamino-diphenylether
(38) 4-isothiocyano-4'-methylsulfonyl-diphenylether
(39) 4-isothiocyano-4'-methylsulphinyl-diphenylether
(40) 4-isothiocyano-4'-phenylsulphonylamino-diphenylether
(41) 4-isothiocyano-4'-methylsulphonylamino-diphenylether
(42) 4-isothiocyano-4'-chloromethylsulphonylamino-diphenylether
(43) 2-isothiocyano-diphenylthioether
(44) 2-isothiocyano-5-thiocyano-diphenylthioether
(45) 2-isothiocyano-4'-thiocyano-diphenylthioether
(46) 2-isothiocyano-2'-nitro-diphenylthio ether
(47) 2,2'-diisothiocyano-diphenylthioether
(48) 2-isothiocyano-4'-chloro-5-thiocyano-diphenylthioether
(49) 2-isothiocyano-2',5'-dichloro-5-thiocyano-diphenylthioether
(50) 4-isothiocyano-4'-bromo-diphenylthioether
(51) 4-isothiocyano-4'-methyl-diphenylthioether
(52) 4-isothiocyano-4'-nitro-diphenylthioether
(53) 4,4'-diisothiocyano-diphenylthioether
(54) 4-isothiocyano-2-carboxy-4'-chloro-diphenylthioether
(55) 4-isothiocyano-2-carboxy-4'-methyl-diphenylthioether
(56) 2-isothiocyano-4-thiocyano-diphenylsulphoxide
(57) 4-isothiocyano-2'-nitro-diphenylsulphoxide
(58) 4-isothiocyano-4'-nitro-diphenylsulphoxide
(59) 4,4'-diisothiocyano-diphenylsulphoxide
(60) 4-isothiocyano-diphenylsulphone
(61) 4,4'-diisothiocyano-diphenylsulphone Anthelmintic compositions, including feed additives according to the invention, which contain as active ingredients the compounds of the general Formula I or the salts thereof which are nontoxic to the organism, can be administered directly to animals in the form of solutions, emulsions, suspensions, drenches, powders, tablets or boluses or in the form of gelatin capsules, or they can be admixed to their feed.

The active substances can be administered to helminth-infested animals or to animals to be protected against helminths in the form of therapeutical preparations either as one single dose or repeatedly, the single dosage, depending on the type of animal, preferably between 25 and 1000 mg. per kg. bodyweight. In some cases better results are obtained or the total amount required for a cure can be decreased by protracted administration. The concentration in which the active substances in the form of such agents are added, e.g., to feeds or liquids given to animals are between 0.05 and 1% by weight.

To prepare the forms of application given above, conventional solid carriers can be used, for example kaolin, talcum, bentonite, sodium chloride, calcium phosphate, hydrocarbons, cellulose powder, Carbowaxes, gelatins, or liquids such as water, if desired with the addition of surface active agents, ionic or nonionic dispersing agents or emulsifying agents, oils and other solvents which do not injure the animal organism.

These agents can also be added in solid form to the animals' feed. Suitable carrier materials in feed concentrates (feed additives) are, among others and in addition to those mentioned above, energy-producing feed, grain feed, protein concentrates, fish meal, soya-bean meal, cottonseed meal and linseed meal. Such a concentrate, usually having a concentration of about 25% by weight, is then thoroughly mixed with other conventional feed additives or fillers, such as mineral agents, vitamins, antibiotics, chemotherapeutics, bacteriostatic, fungistatics, coccidiostatics, hormone preparations, substances having an anabolic action or other substances which promote growth, influence the quality of the meat of animals to be slaughtered or are useful to the animal organism in any other way. In this manner, a "premixture" (feed additive) is obtained which contains, e.g., 5–10% by weight of the active substance of the general Formula I. A suitable amount of this premixture is then equally distributed by means of a mixer in a usual commercial food such as a grain mixture or other vegetable or animal substances. The finished feed contains the substances of Formula I preferably in a concentration of about 0.05–1% by weight.

Tests performed on hens and sheep suffering from helminthiasis are described below. As has been shown in these tests on hens infested with *Ascaridia galli*, the active substances of general Formula I are well tolerated by the animal organism and are substantially less toxic than allyloxyphenyl isothiocyanate.

Tests on hens infested with *Ascaridia galli*

5 to 6 week old chickens are artificially infested with *Ascaridia galli* (maw worms). Groups each containing 5 hens were used for each test. The active substances were administered to the animals in two doses per day over a period of 3 days (2 dosages/day, 3 days). Hens infested at the same time but not treated are used as control animals.

The number of *Ascaridia galli* eliminated by each group of test animals within 5 days after the administration of the first dose of active substance was determined daily as well as the number of worms still found in the intestine at necropsy on the 5th day of the test. In addition, the number of hens no longer infested with worms was also determined.

Tests on sheep infested with *Haemonchus contortus*

Sheep weighing about 28 kg. each which had been artificially infested with *Haemonchus contortus* were treated with 50 mg./kg. bodyweight of 4,4'-diisothiocyanodiphenyl ether administered by one single injection into the paunch. The amount of parasite ova excreted (ova per gram faeces) was determined daily both before and after the injection, the vitality of the ova being established by the number of developed larvae. In the two sheep treated, the number of ova decreased on the average by 90% after one administration of the above active ingredient. No secondary effects could be observed.

The following nonlimitative examples are given for the production of forms of application of anthelmintically effective veterinary-medical preparations and feed additives as well as tests carried out with them on young piglets and fowls. Parts and percentages are given therein by weight.

EXAMPLE I

A wettable powder is produced by thoroughly milling and mixing 50 parts of 2-isothiocyano-4-chlorodiphenyl ether, 30 parts of a synthetic calcium silicate (microcell), 19.5 parts of kaolin and 0.5 part of a solid condensation product obtained from ethylene oxide and propylene oxide having a molecular weight of about 8000, having a central block of propylene polymer of an average molecular weight of about 1500 flanked on each side by ethylene oxide polymer (for example the commercially available "Pluronics F 68"). When this mixture is stirred with water, a pulpy concentrate is obtained which is particularly suitable for administration to pets and domestic animals.

Similar results are obtained when replacing the diphenyl ether in the above composition by an equal amount of 2-isothiocyano-diphenyl thioether, 3-isothiocyano-4-methyldiphenyl sulphone, or 4,4'-diisothiocyanodiphenyl sulphoxide.

EXAMPLE II 1 part of 4,4'-diisothiocyano-diphenyl ether is carefully mixed with 19 parts of sodium chloride and this mixture is administered to the animals in such amounts that a daily dosage of 50–1000 mg. active substance per kg. bodyweight is taken up. Such salt mixtures can also be incorporated into boluses or gelatin capsules and administered to the animals as such.

EXAMPLE III 50 parts of 2-isothiocyano-diphenyl thioether are thoroughly mixed with 0.8 part of sodium benzoate, 2 parts of a tylose kaolin mixture (1:1), 0.05 part of sodium lauryl sulphate, 5 parts of sorbitan monooleate and 42.15 parts of white flour to form a 50% concentrate which can be dispersed in any concentration desired, e.g., in water or milk.

| Active substance | Test group No. | Total daily dose, mg./kg. | *Ascaridia galli* eliminated from 5 hens in 4 days | | No. of worm-free hens | General condition of hens |
|---|---|---|---|---|---|---|
| | | | Absolute Number | Percent of the number of worms in 5 hens | | |
| 4,4'-diisothiocyano-diphenyl ether | Ia | 500 | 131 | 100 | 5 | Good. |
| | Ib | | 220 | 100 | 5 | Do. |
| | IIa | 250 | 191 | 98 | 4 | Do. |
| | IIb | | 63 | 46 | 3 | Do. |
| 3-allyloxy-phenylisothiocyanate (known substance) | IIIa | 500 | 0 | 27 | 1 | 3 dead. |
| | IIIb | | 70 | 0 | 0 | 4 dead. |
| | IVa | 250 | 53 | 35 | 0 | Apathetic. |
| | IVb | | 1 | 1 | 0 | Apathetic, lost weight. |

EXAMPLE IV 50 parts of 4-isothiocyanodiphenyl ether are thoroughly mixed with 0.8 part of sodium benzoate, 2 parts of tylose, 5 parts of sorbitan monooleate and 42.2 parts of white flour to form a 50% concentrate which can be dispersed in any concentration desired, e.g., in water or milk. If such a suspension is fed to growing pets and domestic animals, the rate of their gain in weight is greater than that of control animals.

EXAMPLE V 10 parts of 4,4'-diisothiocyanodiphenyl ether are thoroughly mixed with 90 parts of a concentrated feed meal which is well balanced with regard to its nutritional content. The concentrated feed meal consists of:

Roughage—4.5%
Crude protein—18.5%
Digestible protein—15.7%
Total nutrients—66.5%
Vitamin A—9,000 I.U./kg.
Vitamin $D_3$—1,200 I.U./kg.
Vitamin $B_2$—6 mg./kg.

The feed additive can be fed to pigs and sheep as such in a measured quantity or can be included in a 0.05–1% admixture (weight content of active substance) in the normal feed. Higher doses are administered over a shorter time, lower doses are given over a more extended time. The general condition of the animals is improved and simultaneously, a better rate of weight gain is attained.

EXAMPLE VI 4-isothiocyano-4'-methylthio-diphenyl ether is intimately blended with a feed containing:

Roughage—4–5%
Crude protein—18–20%
Total nutrients—67–70%
Vitamin A—12,000 I.U./kg.
Vitamin $D_3$—1,500 I.U./kg.
Vitamin $B_2$—8 mg./kg.

to form a 0.05–0.5% active substance containing feed mixture. This mixture is specially suited for feeding fowls.

EXAMPLE VII 2-chloro-4,4'-diisothiocyanodiphenyl ether is triturated with dextrin or sugar to form a 20% concentrate. 1 g. of this mixture is dissolved in 1 litre of full cream milk. This solution is given to 10–20 days old calves once daily for 4 weeks. The calves fed in this way with 200 mg. of active substance per litre of milk showed a better increase in weight than those which received no additive in the milk.

EXAMPLE VIII 4-chloro-4'-isothiocyanodiphenyl ether is finely ground with a previous sieved feed of the composition:

Roughage—4–6%
Crude protein—18–20%
Total nutrients—67–70%
Vitamin A—4,000 I.U./kg.
Vitamin $D_3$—600 I.U./kg.

to form a 5% active substance-containing concentrate. Portions of this mixture were mixed with a commercial pig meal and fed to young pigs so that each animal at each feed received 100 mg. of active substance per kilogram of pig metal.

The test groups each containing 5 young pigs showed greater increase in weight than the control animals.

EXAMPLE IX

A poultry feed of the following composition is prepared:

| Basic feed: | G. |
|---|---|
| Semolina | 220 |
| Coarsely ground maize | 220 |
| Coarsely ground barley | 80 |
| Groats | 60 |
| Suet | 50 |
| Codfish meal | 100 |
| Fish meal | 30 |
| Skimmed milk powder | 20 |
| Soya cake | 100 |
| Sunflower cake | 70 |
| Peanut cake | 30 |
| Bone meal | 5 |
| Calcium carbonate | 10 |
| Sodium chloride | 3 |
| Milled sand | 2 |
| | 1000 |

The following additives are added to this basic feed per kilogram:

| | Mg. |
|---|---|
| Lysine | 500 |
| Bacitracin zinc salt | 20 |
| Nitrofurazone | 125 |
| Trace elements: | |
| Fe | 10 |
| Cu | 1 |
| Mn | 50 |
| I | 1.5 |
| Zn | 8 |
| Vitamin $B_1$ | 1.5 |
| Vitamin $B_2$ | 4 |
| Vitamin $B_6$ | 2 |
| Vitamin $B_{12}$ | 10 |
| Nicotinic acid | 10 |
| Choline | 25 |
| Pantothenic acid | 10 |
| Folic acid | 0.5 |
| | 778.5 |

| | I.U. |
|---|---|
| Vitamin A | 12,000 |
| Vitamin $D_3$ | 1,000 |
| Vitamin E | 10 |

300 mg. of 3'-trifluoromethyl-4'-chloro-4-isothiocyano-diphenyl ether were then added per kg. to the above feed mixture and a group of white leghorn chickens of an initial weight of about 250 g. were fed with this mixture for 6 weeks. Compared with a control group over the same period, the average increase in weight was about 7%.

We claim:

1. An anthelmintic animal feed concentrate composition comprising an anthelmintically effective amount of a compound of the formula

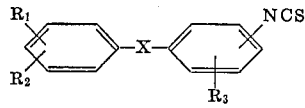

wherein
each of $R_1$, $R_2$ and $R_3$ represent hydrogen, bromine, chlorine, hydroxy, nitro, cyano, thiocyano, isothiocyano, carboxy, lower alkoxycarbonyl, sulfamoyl, alkyl of 1 to 9 carbon atoms, lower alkoxy, lower alkyl thio, halogeno-lower alkyl, lower alkylamino, di-lower alkylamino, lower alkanoylamino, N-lower alkylsulfamoyl, N,N-di-lower alkylsulfamoyl, lower alkylsulfonylamino, chloro-lower alkyl-sulfonylamino, phenylsulfonylamino, lower alkylsulfonyl or lower alkylsulfinyl, and X represents oxygen, sulfur, sulfonyl or sulfinyl, and an energy-producing animal feed concentrate.

2. A composition according to claim 1 wherein said compound is present in an amount of about 5 to 10% by weight of the composition.

3. A composition according to claim 1 wherein said compound is 4-nitro-4'-isothiocyano diphenyl ether.

4. A composition according to claim 1 wherein said compound is 3-diethylamino - 2',4' - di-isothiocyano diphenyl ether.

5. A composition according to claim 1 wherein said compound is 2-nitro-2'-isothiocyano diphenyl sulfide.

6. A composition according to claim 1 wherein said compound is 4-nitro-2'-isothiocyano diphenyl sulfoxide.

7. A composition according to claim 1 wherein said compound is 4-nitro-4'-isothiocyano diphenyl sulfide.

8. A composition according to claim 1 wherein said compound is 2-nitro-4'-isothiocyano diphenyl sulfoxide.

9. A composition according to claim 1 wherein said compound is 4-nitro-3'-chloro-4'-isothiocyano diphenyl ether.

10. A method for controlling helminths in domestic and farm animals which comprises administering orally to a domestic or farm animal an anthelmintically effective amount of a compound of the formula

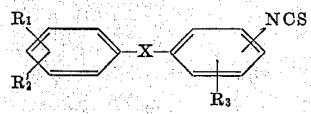

wherein each of $R_1$, $R_2$ and $R_3$ represents hydrogen, bromine, chlorine, hydroxy, nitro, cyano, thiocyano, isothiocyano, carboxy, lower alkoxycarbonyl, sulfamoyl, alkyl of 1 to 9 carbon atoms, lower alkoxy, lower alkylthio, halogeno-lower alkyl, lower alkylamino, di-lower alkylamino, lower alkanoylamino, N-lower alkylsulfamoyl, N,N-di-lower alkylsulfamoyl, lower alkylsulfonylamino, chloro-lower alkylsulfonylamino, phenylsulfonylamino, lower alkyl-sulfonyl or lower alkylsulfinyl, and X represents oxygen, sulfur, sulfonyl or sulfinyl.

11. A method according to claim 10, wherein said active ingredient is administered in an amount of between 25 and 1000 mg. per kg. bodyweight of the treated animal.

12. A method according to claim 10 wherein said compound is 4-nitro-4'-isothiocyano diphenyl ether.

13. A method according to claim 10 wherein said compound is 3-diethylamino - 2',4' - di-isothiocyano diphenyl ether.

14. A method according to claim 10 wherein said compound is 2-nitro-2'-isothiocyano diphenyl sulfide.

15. A method according to claim 10 wherein said compound is 4-nitro-2'-isothiocyano diphenyl sulfoxide.

16. A method according to claim 10 wherein said compound is 4-nitro-4'-isothiocyano diphenyl sulfide.

17. A method according to claim 10 wherein said compound is 2-nitro-4'-isothiocyano diphenyl sulfoxide.

18. A method according to claim 10 wherein said compound is 4-nitro-3'-chloro - 4' - isothiocyano diphenyl ether.

References Cited
UNITED STATES PATENTS

| | | | |
|---|---|---|---|
| 2,263,386 | 11/1941 | Hester | 260—454 |
| 2,900,304 | 8/1959 | Martin | 167—65 |
| 3,322,525 | 5/1967 | Martin et al. | 71—2.3 |
| 2,937,970 | 5/1960 | Stevenson | 424—302 |
| 3,336,191 | 8/1967 | Craig et al. | 424—273 |

SAM ROSEN, Primary Examiner

U.S. Cl. X.R.

260—454